(12) United States Patent
Fendt et al.

(10) Patent No.: US 7,263,460 B2
(45) Date of Patent: Aug. 28, 2007

(54) DEVICE AND METHOD FOR MEASURING ACCELERATIONS FOR A PASSENGER PROTECTION SYSTEM IN A VEHICLE

(75) Inventors: Günter Fendt, Schrobenhausen (DE); Helmut Steurer, Gerolsbach-Junkenhofen (DE); Helmut Christl, Kösching (DE); Christian Hollweck, Reichertshofen (DE)

(73) Assignee: Conti Temic Microelectronic GmbH, Nürnberg (DE)

( * ) Notice: Subject to any disclaimer, the term of this patent is extended or adjusted under 35 U.S.C. 154(b) by 0 days.

(21) Appl. No.: 10/566,488

(22) PCT Filed: Jul. 3, 2004

(86) PCT No.: PCT/DE2004/001142

§ 371 (c)(1),
(2), (4) Date: Jan. 30, 2006

(87) PCT Pub. No.: WO2005/014342

PCT Pub. Date: Feb. 17, 2005

(65) Prior Publication Data

US 2006/0212258 A1 Sep. 21, 2006

(30) Foreign Application Priority Data

Jul. 30, 2003 (DE) ................ 103 35 170

(51) Int. Cl.
*G01P 15/00* (2006.01)
(52) U.S. Cl. ............... 702/141; 702/142; 702/145; 701/45; 701/46; 701/70; 701/91; 180/268; 180/271; 180/282; 280/734; 280/735
(58) Field of Classification Search ........... 702/141, 702/142, 145; 701/45–46, 70, 91; 180/268, 180/271, 282; 280/734, 735
See application file for complete search history.

(56) References Cited

U.S. PATENT DOCUMENTS 5,083,276 A * 1/1992 Okano et al. ............... 701/46

(Continued)

FOREIGN PATENT DOCUMENTS

| DE | 38 16 589 | 11/1989 |
|---|---|---|
| DE | 196 51 123 | 6/1998 |
| DE | 197 15 575 | 9/1998 |
| DE | 198 52 468 | 5/2000 |

(Continued)

*Primary Examiner*—John Barlow
*Assistant Examiner*—Hien Vo (57) ABSTRACT

Disclosed is a device for measuring accelerations for a vehicle passenger protection system, whereby a first and second acceleration sensor with a first or second sensitivity direction are fitted in relation to a prespecified main direction of measurement, which form a first or second transverse projection in their projection onto a first or second transverse direction which is aligned vertically to the main direction of measurement, together with suitable evaluation devices for evaluating the processed first and second measuring signals. The first and second transverse projection of the first and second sensitivity directions run parallel to each other, and the first and second main projection of the first and second sensitivity direction run antiparallel to each other. Furthermore, the evaluation of the measured values provided by the sensors is conducted in such a manner that at least a partial error compensation results when the reference value changes in relation to the first and the second signal. Preferably, the evaluation is conducted in such a way dependant on the alignment of the first and second sensitivity direction that the error compensation is at a maximum level when the first and second reference value is changed.

19 Claims, 7 Drawing Sheets

Stand der Technik

U.S. PATENT DOCUMENTS

| | | | |
|---|---|---|---|
| 5,440,913 A * | 8/1995 | Crispin et al. | 73/1.38 |
| 5,620,203 A * | 4/1997 | Jeenicke et al. | 280/735 |
| 6,002,974 A * | 12/1999 | Schiffmann | 701/36 |
| 6,023,664 A | 2/2000 | Bennet | 702/141 |
| 6,424,897 B1 * | 7/2002 | Mattes et al. | 701/45 |

FOREIGN PATENT DOCUMENTS

| | | |
|---|---|---|
| DE | 100 02 471 | 7/2001 |
| EP | 0 311 039 | 4/1989 |
| EP | 0 292 669 | 3/1994 |

* cited by examiner

DEVICE AND METHOD FOR MEASURING ACCELERATIONS FOR A PASSENGER PROTECTION SYSTEM IN A VEHICLE

BACKGROUND OF THE INVENTION

The invention relates to a device for measuring accelerations for a vehicle passenger protection system.

In order to improve road traffic safety, improvements are continuously being made to already known passenger protection systems in vehicles, in order to provide the best possible protection for vehicle passengers in cases where the vehicle collides with an obstacle or another vehicle, for example. Typically, a passenger protection system will comprise a control device with a sensor arrangement, which may comprise one or more acceleration sensors, and an evaluation unit, one or more satellite sensors which can also comprise one or more acceleration sensors, and suitable protective devices such as airbags, belt tighteners and roll bars.

In order to measure, obtain or record (these terms will be used below synonymously) the accelerations which are generated by a collision, different systems with different arrangements of acceleration sensors are known. A differentiation is made between sensors which are arranged centrally in the vehicle, and additional sensors—"satellite sensors"—which are arranged decentrally in the vehicle. The latter are usually arranged near the outer shell of the vehicle, the precise location being selected in accordance with the specific function of the sensor.

The sensors which are sensitive to accelerations are referred to synonymously below as "acceleration sensors", "acceleration recording devices" or, in an even more abbreviated form, as "sensors". These generally comprise an directional characteristic with regard to the direction of the influential acceleration in relation to the alignment of the sensor. The directional characteristic specifies a main sensitivity direction, in which the measuring sensitivity of the sensor, i.e. the strength of its output signal in relation to the value of the acceleration, is at maximum level when the direction of the acceleration is aligned in parallel or anti-parallel with the main sensitivity direction.

In the following, the assumption is made that all the directions mentioned above are located approximately at the same level, in particular, at the level in which the vehicle is moving. Furthermore, it is assumed that each sensor is electrically connected with the relevant evaluation channel, whereby the measuring signal directly generated by the sensor is processed and/or is evaluated at least partially, and the evaluation unit is fed into the control device. An evaluation channel may comprise an analogue-digital converter, a switch to filtering (for example equalisation), at least one switch to integration, a switch to the comparison of the signal with a prespecified threshold value and/or logical switches to linking signals which have been generated in the same sensor or by another sensor, or by another means. In the simplest case, an evaluation channel solely comprises devices to forward the measuring signal generated by the sensor to the evaluation unit. In the evaluation unit, the signals from the evaluation channels are processed and/or evaluated, and a trigger signal is generated in order to trigger the safety facilities in the vehicle.

In the evaluation channels, and, when appropriate, in the central evaluation unit, analogue measuring signals from the sensors (such as electrical voltages) and the analogue signals generated during the processing stages can be interpreted in relation to reference values (such as a reference voltage). The reference values can be different for different evaluation channels, or can essentially be the same.

In simple processing cases, the signal generated by a sensor which corresponds to an acceleration, for example, is equalised in the evaluation channel in a low-pass filter, and if appropriate, is integrated in an integrator, producing a signal which corresponds to an influential speed. The acceleration and/or speed signal is compared to a threshold value. If the signal exceeds the threshold value, a trigger signal is produced. In order to avoid the safety facility from being triggered unintentionally, for example due to a measuring error or another malfunction of the sensor or another switching element in the evaluation channel, a trigger signal of this type can be subjected to at least one verification check, in which the trigger signal is linked to at least one verification signal which is generated by an independent evaluation. In simple cases, the trigger signal can be linked, for example, to a trigger signal which is generated independently in a different evaluation channel using logical "AND" switching.

In order to cover in the best possible way all the directions of the accelerations at the level of movement which affect the vehicle, and in order to determine the value and direction of the influential acceleration, two acceleration sensors are usually provided (which are preferably positioned at right-angles to each other). With a single acceleration sensor, however, only those accelerations can detected which are travelling in a single direction. When the acceleration sensor is directed towards the longitudinal vehicle axis, for example, it is not able to detect a collision from the side, and when there is a collision with an acceleration component in the direction of the longitudinal vehicle axis, a differentiation can be made, using the preceding sign of the measured acceleration components, as to whether the components are aligned from front to back (as is the case with a frontal collision) or vice-versa (as is the case with a rear collision).

In order to provide two "full coverage" acceleration sensors, two preferred sensor arrangements have been established in practise:

a) the two sensors are aligned along the longitudinal vehicle axis (X installation axis) and a transverse vehicle axis (Y installation axis), or b) both sensors are essentially aligned in the direction of the longitudinal vehicle axis at an angle of ±45 degrees.

Arrangement a) will not be discussed here in further detail. Arrangement b) is explained below in reference to FIG. 1, since this arrangement can be used as a basis for explaining in a simple manner the effect and the advantage of the invention. This arrangement, however, is only used as an example of arrangements with sensors which are generally aligned at an angle to the longitudinal or transverse axis of the vehicle.

EP 0 311 039 A2 discloses a sensor arrangement with three acceleration recorders, of which the three sensitivity directions are in each case arranged offset from each other by 120° in order to measure acceleration components from all directions. DE 38 16 589 A1 and DE 100 02 471 A1 both disclose a sensor arrangement with two sensors, of which the sensitivity directions of the first sensor form an angle of 45 degrees, and those of the second sensor form an angle of 135 degrees to the longitudinal vehicle axis. However, none of these publications deal with the problem of the influence of the change in a reference value on the tripping behaviour of a passenger protection facility.

SUMMARY OF THE INVENTION

The object of the present invention is therefore to recommend a device and a procedure for measuring accelerations for a vehicle passenger protection system which only comprise a low level of sensitivity to deviations to the reference values in evaluation channels.

This object is attained by means of a device having first and second acceleration sensors and an evaluation device for evaluating the signals measured by the first and second acceleration sensors and by a procedure for measuring accelerations in a passenger vehicle.

A basic principle of the invention, in a device with a sensor arrangement which comprises a pair of two acceleration sensors, is to arrange and align one or both sensors in relation to the other sensor and to the main direction of measurement of an acceleration, in such a manner that the component of its sensitivity direction that is projected onto the main direction of measurement (main projection) is aligned counter to the main projection of the sensitivity direction of the other sensor, and that this is combined with an evaluation, conducted in an appropriate manner, of the sensor signals generated by both sensors. This compensates, at least partially, the influence of the change in reference value in the channels which belong to the sensors. In particular, the effect of any changes to the reference value on the signal evaluation is reduced, the stability of the evaluation algorithm in relation to the measuring signals generated by the sensors, in particular when potential deviations to the reference values in the evaluation channels arise, is increased, and finally, the robustness of the evaluation procedure is increased.

The invention now relates to a device for measuring accelerations for a vehicle passenger protection system, which is adapted to a prespecified main direction of measurement, and which comprises at least one first acceleration sensor with a first sensitivity direction, which forms a first main projection in its projection onto the main direction of measurement, and a first transverse projection in its projection onto a transverse direction which is aligned vertically to the main direction of measurement, and a first evaluation channel for processing a first measuring signal from the first acceleration sensor in relation to a first reference value. The device furthermore comprises at least one second acceleration sensor with a second sensitivity direction, which forms a second main projection in its projection onto the main direction of measurement, and a second transverse projection in its projection onto the transverse direction, and a second evaluation channel for processing a second measuring signal from the second acceleration sensor in relation to a second reference value, together with evaluation devices for evaluating at least the first processed measuring signal and the second processed measuring signal, and, at least partially, a trigger signal for the passenger protection system, which is generated on the basis of these.

According to the invention, the first and second transverse projections in the first and second sensitivity directions are aligned parallel to each other, and the first and second main projection in the first and second sensitivity directions are aligned antiparallel to each other. Furthermore, the evaluation is conducted in such a manner that at least a partial error compensation results when the first or second reference value in the first or second evaluation channel changes. Both here and in the description below, the term "antiparallel" is used to mean "running in parallel in a counter direction".

Advantageously, the evaluation is conducted in such a way dependant on the alignment of the first and second sensitivity direction to the main direction of measurement that the error compensation is at a maximum level when the first and second reference value is changed.

Preferably, the evaluation comprises a comparison of a first evaluation function of the processed first measuring signal and the second processed measuring signal with a corresponding second evaluation function of the first initial threshold and the second initial threshold.

In particular, the first evaluation channel can comprise a first initial threshold, and the second evaluation channel can comprise a second initial threshold, and the first evaluation function is a weighted difference or total of the processed first measuring signal and the processed second measuring signal, and the corresponding second evaluation function can be a weighted total or the difference between the first initial threshold and the second initial threshold. This makes the evaluation particularly simple to implement.

In particular, the first reference value and the second reference value can be a reference value which is shared by the first and second evaluation channel, for example when the measuring signals or processed signals are voltages which are measured in relation to a shared potential.

The angular distance of the first sensitivity direction and the angular distance of the second sensitivity direction preferably does not equal 0° or 90°, both in the main direction of measurement and in the transverse direction, and is in particular larger than or equal to 10°. The angular distance between the first sensitivity direction and the angular distance between the second sensitivity direction is also preferably essentially 90°. In particular, the angle of the first sensitivity direction can be 45° or 135°, and the angle of the second sensitivity direction can be 135° or 45° to the main direction of measurement. Each of these designs for the arrangement of both sensors increases the measuring precision of the facility, together with the precision with which a direction of the acceleration which is affecting the vehicle can be determined. As an alternative to the exemplary angles given, in a preferred embodiment, angles of −45° and −135°, or −135° and −45°, or 225° and 315°, or 315° and 225°, are also possible.

The main direction of measurement can essentially be the forwards direction of the vehicle, for example. The main direction of measurement can, as an alternative, also be essentially aligned vertically to the forwards direction of the vehicle. The first and second acceleration sensor and the evaluation device can be arranged on a central unit. An embodiment of this type is particularly compact and easy to install.

Furthermore, the device can comprise at least one upfront sensor or at least one side sensor, or a so-called "safing" sensor. Additional information and signals which are used for verification purposes, which increase safety and which reduce the risk of the passenger protection system being triggered erroneously can be obtained from the additional sensors.

The invention furthermore relates to a procedure for measuring accelerations for a vehicle passenger protection system comprising the following stages:

i) The determination of a main direction of measurement in relation to a forwards direction of the vehicle ii) The provision of a first acceleration sensor with a first sensitivity direction, which forms a first main projection in its projection onto the main direction of measurement, and a first transverse projection in its projection onto a transverse direction which is aligned vertically to the main direction of measurement iii) The provision of a second acceleration sensor with a second sensitivity direction, which forms a second main projection in its projection onto the main direction of measurement, and a second transverse projection in its projection onto a transverse direction. According to an aspect of the invention, the first and second transverse projection of the first and second sensitivity direction are parallel to each other, and the first and second main projection of the first and second sensitivity direction are antiparallel to each other.

The invention furthermore comprises iv) The processing of the first measuring signal from the first acceleration sensor to form a first processed signal in relation to a first reference value in a first evaluation channel for processing the first signal from the first acceleration sensor v) The processing of the second measuring signal from the second acceleration sensor to form a second processed signal in relation to a second reference value in a second evaluation channel for processing a second signal from the second acceleration sensor vi) The evaluation of the first and second processed signal, so that at least a partial error compensation results when the first and second reference values in the first and second evaluation channel change.

The first reference value and the second reference value can be a reference value which is shared by the first and second evaluation channel.

It is advantageous that the evaluation which is dependant on the alignment of the first and second sensitivity direction to the main direction of measurement is conducted in such a manner that the error compensation when the first and second reference value is changed is at the maximum level. In an advantageous manner, the evaluation in stage vi) comprises: a) The formation of a weighted threshold summation function or threshold subtraction function for the first initial threshold and the second initial threshold; b) The formation of a weighted subtraction function or summation function of the processed first measuring signal and the processed second measuring signal; c) The comparison of the weighted subtraction function or summation function from stage b) with the weighted threshold summation function or threshold subtraction function from stage a); whereby the trigger signal is furthermore set into the trigger-ready state when the weighted subtraction function or summation function from stage b) exceeds the weighted threshold summation function or threshold subtraction function from stage a).

In particular, in stage b), the weighted subtraction function or summation function of the processed first measuring signal (F1) and the processed second measuring signal (F2) can comprise the formula a1*F1−a2*F2 or a1*F1+a2*F2 whereby a1 and a2 are scaling factors with 0<a1, a2<1, and in stage a), the weighted threshold summation function or threshold subtraction function of the first initial value (T1) and the second initial value (T2) comprise the formula b1*T1−b2*T2 or b1*T1+b2*T2 whereby b1 and b2 are scaling factors with 0<b1, b2<1.

Here, it is advantageous that:

a1≈cos α1 and a2≈cos α2 whereby α1 is the angle between the main direction of measurement and the first sensitivity direction, and α2 is the angle between the main direction of measurement and the second sensitivity direction.

In a preferred manner, in stages iv) and v) the processing of the first, or measuring, signal of the first, or acceleration, sensor during the procedure comprises at least one integration of the measuring signal.

Further advantages and application opportunities of the present invention will be described below with reference to the exemplary embodiments shown in the drawings.

BRIEF DESCRIPTION OF THE DRAWINGS

In the description, the patent claims, the summary and the drawings, the terms and reference numerals given in the list of reference numerals below are used.

In the drawings.

DETAILED DESCRIPTION OF THE DRAWINGS

In the following, elements which are the same and/or which have the same function may be assigned the same reference numerals. The angle values given are based on a "clockwise coordination system".

Figure 1:
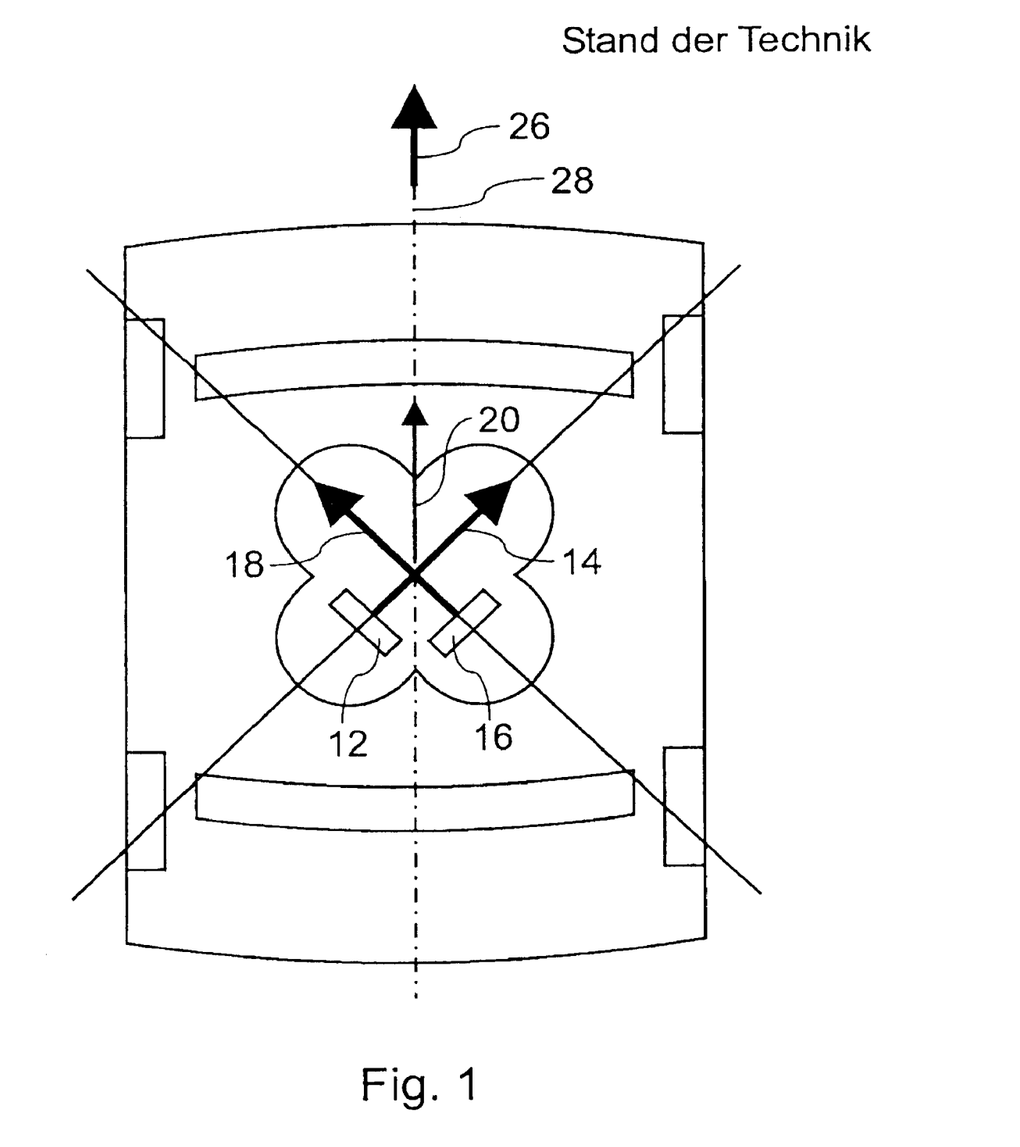
FIG. 1 shows a schematic view of a sensor arrangement in a vehicle in a top view for a main direction of measurement from the front along the longitudinal vehicle axis, with two acceleration sensors aligned at angles of α1=45° and α2=−45° in accordance with the current art

The sensor arrangement shown in FIG. 1 in accordance with the current art comprises a first and a second acceleration recording device, whereby the first acceleration sensor 12 comprises a first sensitivity direction 14 at an angle of +45 degrees in relation to the forwards direction 26 of the vehicle and the second acceleration sensor 16 comprises a second sensitivity direction 18 at an angle of −45 degrees in relation to the forwards direction 26 of the vehicle. The forwards direction 26 corresponds in this example to the main direction of measurement 20, which is essentially parallel to the longitudinal axis 28 of the vehicle and which is aligned towards the front. With a sensor arrangement of this type, the situation described below and shown in FIG. 4A arises for the measuring signals supplied by the first and second acceleration sensor 12 and 16 when a frontal collision occurs, in which a change in the reference value in the first and second evaluation channel has the effect of changing the tripping behaviour of the evaluation algorithm.

Figure 2:
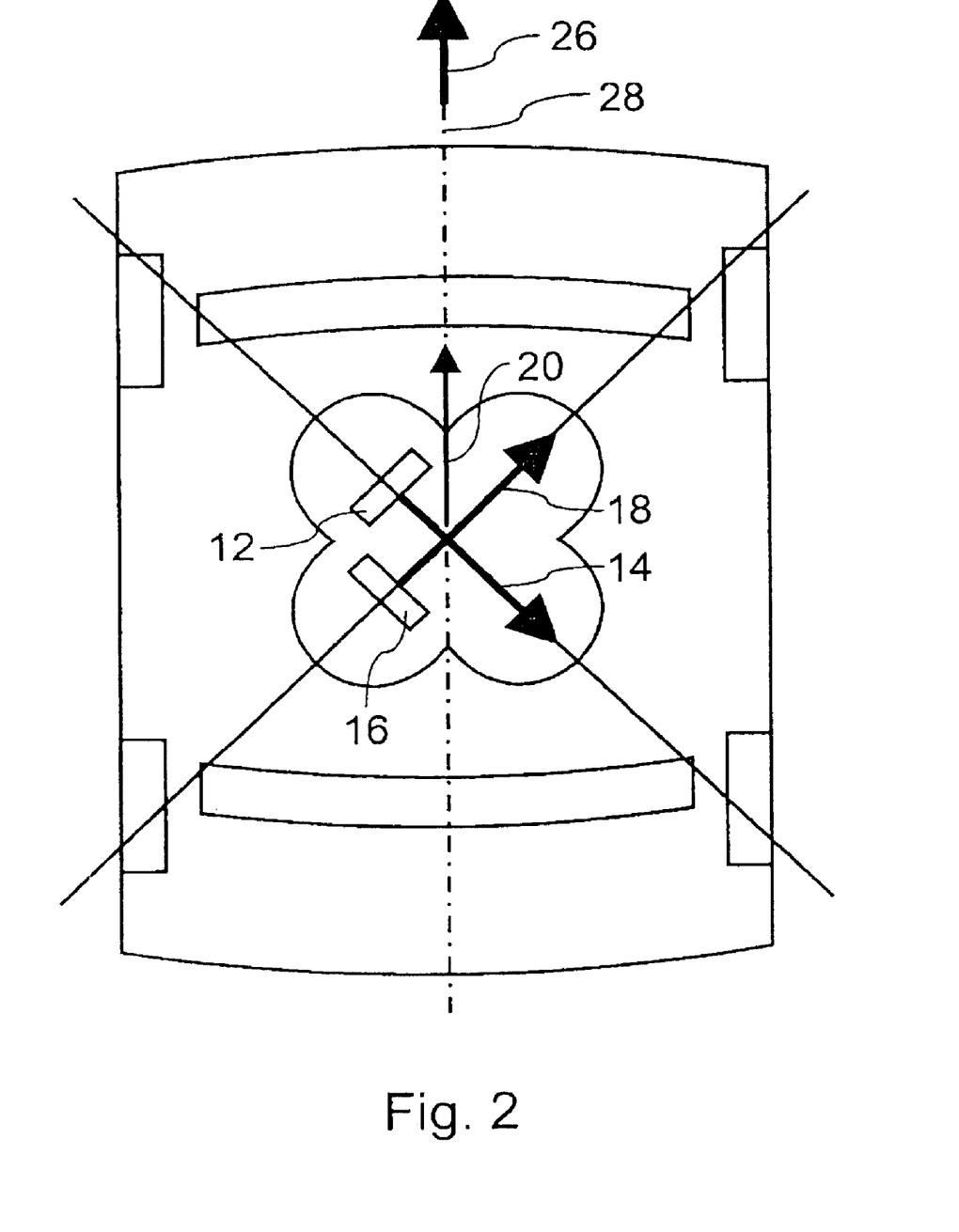
FIG. 2 shows a schematic view of a sensor arrangement in a vehicle in a top view for a main direction of measurement from the front along the longitudinal vehicle axis, with two acceleration sensors aligned at angles of α1=135° and α2=45° in accordance with the invention

According to the invention, a compensation of the influence of the change in the reference value in the first and second evaluation channel is achieved by turning the sensor arrangement in FIG. 1 in a clockwise direction, for example, thus obtaining the sensor arrangement shown in FIG. 2. In the sensor arrangement shown in FIG. 2, the angle between the first sensitivity direction 14 of the first acceleration sensor 12 and the main direction of measurement 20 equals $\alpha 1 = 135$ degrees. The main direction of measurement 20 is, as assumed in FIG. 1, also in the forwards direction 26 along the longitudinal vehicle axis 28. The angle between the sensitivity direction 18 of the second acceleration sensor 16 and the main direction of measurement 20 equals $\alpha 2 = 45$ degrees. The invention is, however, not limited to the specific angle $\alpha 1 = 135$ degrees for the first sensitivity direction 14 and $\alpha 2 = 45$ degrees for the second sensitivity direction 18. It is far more the case that according to the invention, the first and second sensitivity directions 14 and 18 can form any angle within certain minimum angular distances from the main direction of measurement 20 and an almost vertical transverse direction 30. The effect of the invention is also not limited solely to the situation cited as an example, that the two sensitivity directions, 14 and 18, contain a right angle (90 degrees). The sensor alignment according to the invention is described below with reference to FIG. 3.

Figure 3:
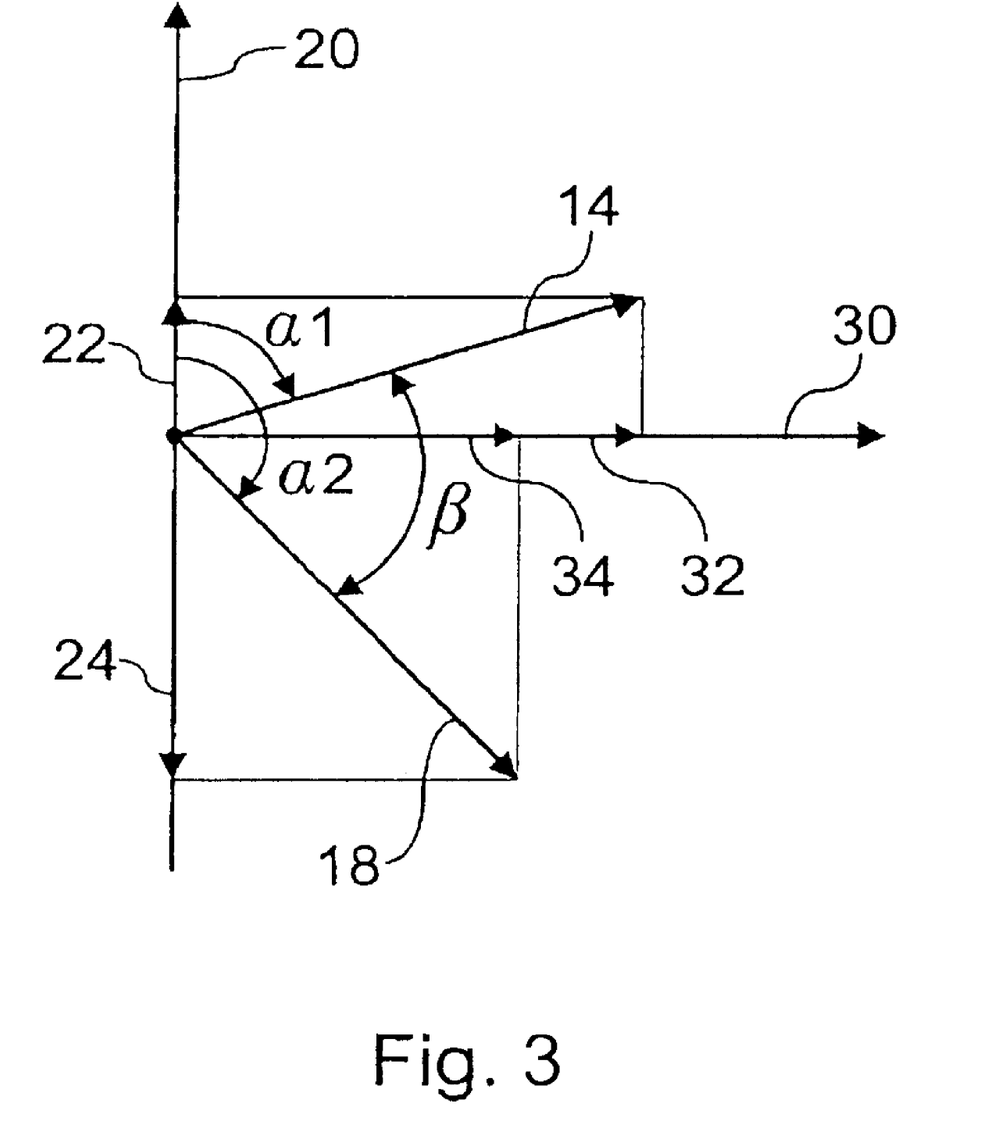
FIG. 3 shows a diagram which clarifies the arrangements and the alignments of the angles between the main direction of measurement and the sensitivity directions of the first and second acceleration sensor according to the invention

FIG. 3 shows the first sensitivity direction 14 of the first acceleration sensor 12 with a related angle $\alpha 1$, and the second sensitivity direction 18 of the second acceleration sensor 16 with a related angle $\alpha 2$, angles $\alpha 1$ and $\alpha 2$ being measured in relation to the main direction of measurement of the sensor arrangement. The first sensitivity direction 14 can be broken down into a first main projection 22 onto the main direction of measurement 20 and a first transverse projection 32 onto the transverse direction 30, which is aligned in the level of movement of the vehicle at an angle of 90 degrees to the main direction of measurement 20. Accordingly, the second sensitivity direction 18 can be broken down into the second main projection 24 onto the main direction of measurement 20 and the second transverse projection 34 onto the transverse direction 30. In the sensor arrangement according to the invention, the first main projection 22 is aligned counter to the second main projection 24, and the first transverse projection 32 of the first sensitivity direction 14 is aligned in the same direction as the second transverse projection 34 of the second sensitivity direction 18. In other words, the sensor arrangement according to the invention is characterised by the fact that when the angle $\alpha 1$ of the first sensitivity direction lies between 0 degrees and 90 degrees (or between 0 degrees and −90 degrees), the angle $\alpha 2$ of the second sensitivity direction 18 lies between 90 degrees and 180 degrees (or between −90 degrees and −180 degrees).

The angular distance $\alpha 1$ of the first sensitivity direction 14 is preferably larger than 5 degrees in relation to the main direction of measurement 20 or the transverse direction 30; even more preferably, it is larger than 6 degrees, and even more preferably, larger than 7 degrees, and even more preferably, larger than 8 degrees, and even more preferably, larger than 9 degrees, and even more preferably, larger than 10 degrees. The same applies to the angular distance of the second sensitivity direction 14 from the main direction of measurement 20, the direction which runs counter to this, and the transverse direction 30. The minimum angular distances are selected according to the "breadth" of the sensitivity characteristics (such as the breadth of the angle scale in relation to half the value of the maximum sensor sensitivity present in the direction of sensor sensitivity) in such a way, that the longitudinal or transverse direction lies outside the breadth of the sensitivity characteristics.

The angle $\beta = |\alpha 2 - \alpha 1|$ between the first and the second sensitivity direction 14 and 18 can be selected as required, taking into account the aforementioned minimum angular distances from the main direction of measurement 20 and the transverse direction 30. However, $\beta$ is preferably 90 degrees. The first sensitivity direction 14 can also be freely selected, taking into account the aforementioned minimum angular distances, and is preferably 45 degrees or 135 degrees. The equivalent applies to the second sensitivity direction 18, which is preferably aligned at an angle $\alpha 2$ of 135 degrees or 45 degrees.

Figure 4A:
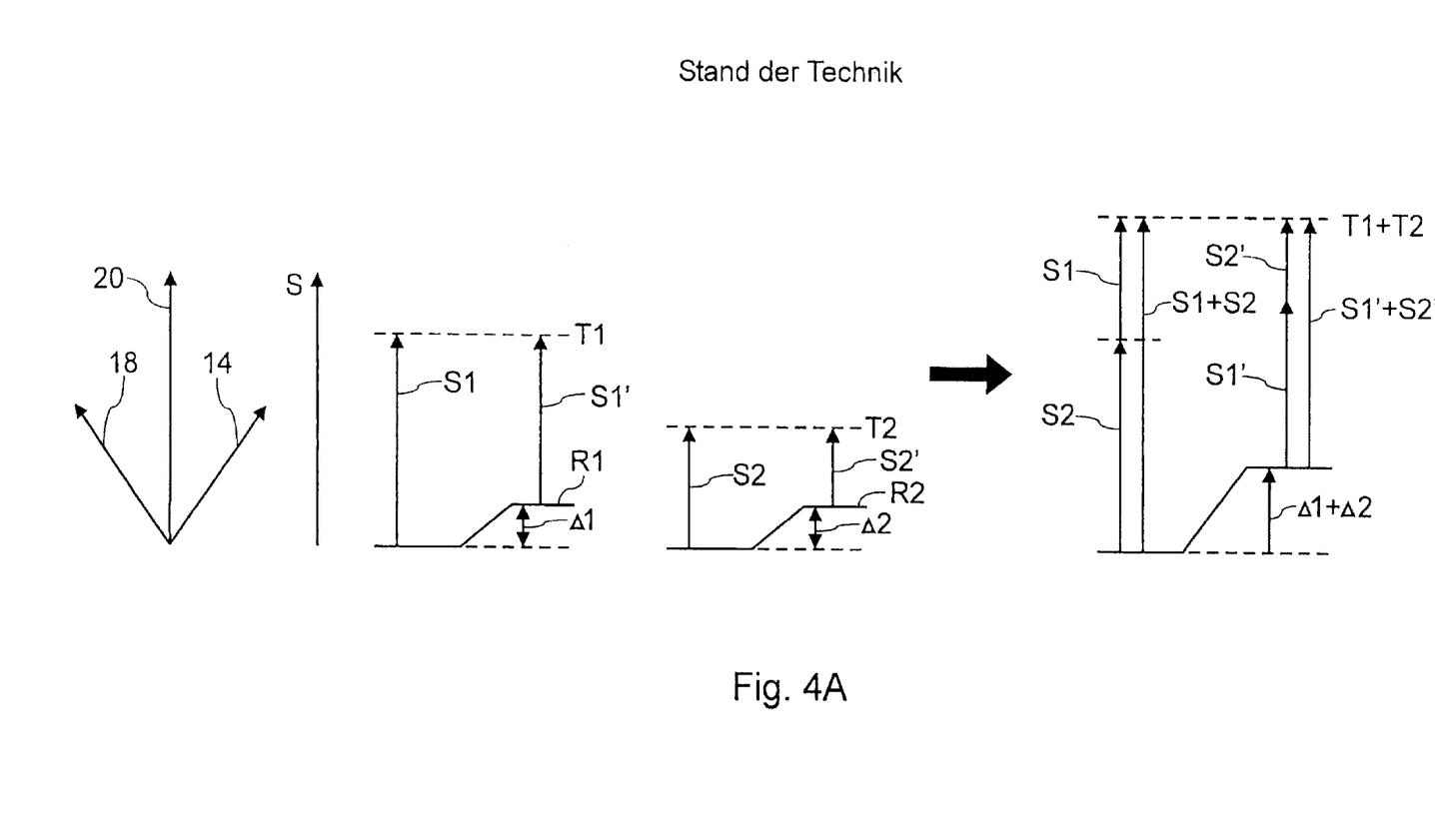
FIG. 4a shows a chart with diagrams which explain the development of the increase in a measuring error when the reference signal is changed in a device with a sensor arrangement in accordance with the current art

In FIG. 4A, it is assumed that a first sensitivity direction 14 of the first acceleration sensor 12 is installed at an angle of less than +45 degrees to the forwards direction 20 of a vehicle, and that a second acceleration sensor 16 with a second sensitivity direction 18 is aligned at an angle of below −45 degrees in relation to the forwards direction 20, in a similar manner to that shown in FIG. 1 and in the left-hand section of FIG. 4a. The first and second sensitivity direction, 14 and 18, can also be aligned differently at ±45 degrees in relation to the longitudinal vehicle axis assumed to be the main direction of measurement. FIG. 4a also contains in its central and right-hand section two charts for the measuring signals generated by the sensors, or the processed signal values which are derived from them. Assuming that a frontal crash has occurred, both sensors 12 and 16 deliver a positive measuring signal in accordance with the positive proportion of the acceleration vectors which influence the first and second sensor, 12 and 16. In the first or second evaluation channel, a first or second initial threshold T1 or T2 is predefined in each case, so that when the measuring signal F1 of the first acceleration sensor, or the measuring signal F2 of the second acceleration sensor reaches a sufficient trigger signal value S1 or S2 to achieve the initial threshold T1 or T2, a trigger signal for the passenger protection facility is generated in the first or second evaluation channel.

Over a further period of time, it is assumed that the reference value in the first evaluation channel changes by a total of $\Delta 1$. For example, this can be caused by an increase in a reference voltage, so that an analogue-digital converter measures an offset fraction. As a result of this, the distance to the initial threshold T1 is reduced, as shown in the drawing, and a trigger signal at a value of $S^1$ is sufficient in order to reach the initial threshold T1 of the first evaluation channel. Accordingly, the change in the reference value in the second evaluation channel triggers a change in the reference value by a value of Δ2. Here, it is assumed that the change Δ2 in the second evaluation channel is the same as the change Δ1 in the first evaluation channel.

If during the evaluation, for example to determine the acceleration component in the longitudinal direction of the vehicle, a total of the signal F1 in the first measuring channel and the signal F2 in the second measuring channel is now created, which is compared with a initial threshold T1+T2, which has been created from the total of the initial thresholds T1 and T2 in the first and second evaluation channel, a total signal value S1+S2 is present in order to reach the initial threshold T1+T2. After a change in the reference value of Δ1 in the first evaluation channel, and Δ2 in the second evaluation channel, the trigger signals S1 or S2 for reaching the initial thresholds T1 or T2 in the two evaluation channels are reduced to the values S1' or S2'. As shown in the drawing in FIG. 4A, the initial threshold for the total signal is reduced by a value of Δ1+Δ2, so that a total signal S1'+S2' is sufficient in order to reach the initial threshold T1+T2. The total formed by the signals also causes the distance to the initial threshold to be reduced in the same way in both evaluation channels, so that the end result is that the evaluation system as a whole reacts more sensitively. When a frontal collision occurs, this leads to an earlier tripping behaviour. In a similar way, the change in the reference value would lead to an earlier tripping behaviour should a frontal crash occur, if the evaluations in the first and second evaluation channel have been conducted independently of each other, and a first trigger signal S1 when the initial threshold T1 is exceeded in the first evaluation channel, and a second trigger signal S2 when the initial threshold T2 is exceeded in the second evaluation channel are additively linked to each other (for example, by using a logical AND link), and are subjected to a threshold value comparison. The change in the tripping behaviour is based on the fact that the change in the reference value in both evaluation channels is the same in relation to the initial threshold. This is finally based on the fact that the vector component of the acceleration measured by the first sensor is aligned in the same way as the vector component of the acceleration measured by the second acceleration sensor. This is finally based on the fact that the sensitivity direction of the first and second acceleration sensor comprise in each case a parallel aligned projection component onto the main direction of measurement, i.e. in the direction in which the overall acceleration is to be measured.

Figure 4B:
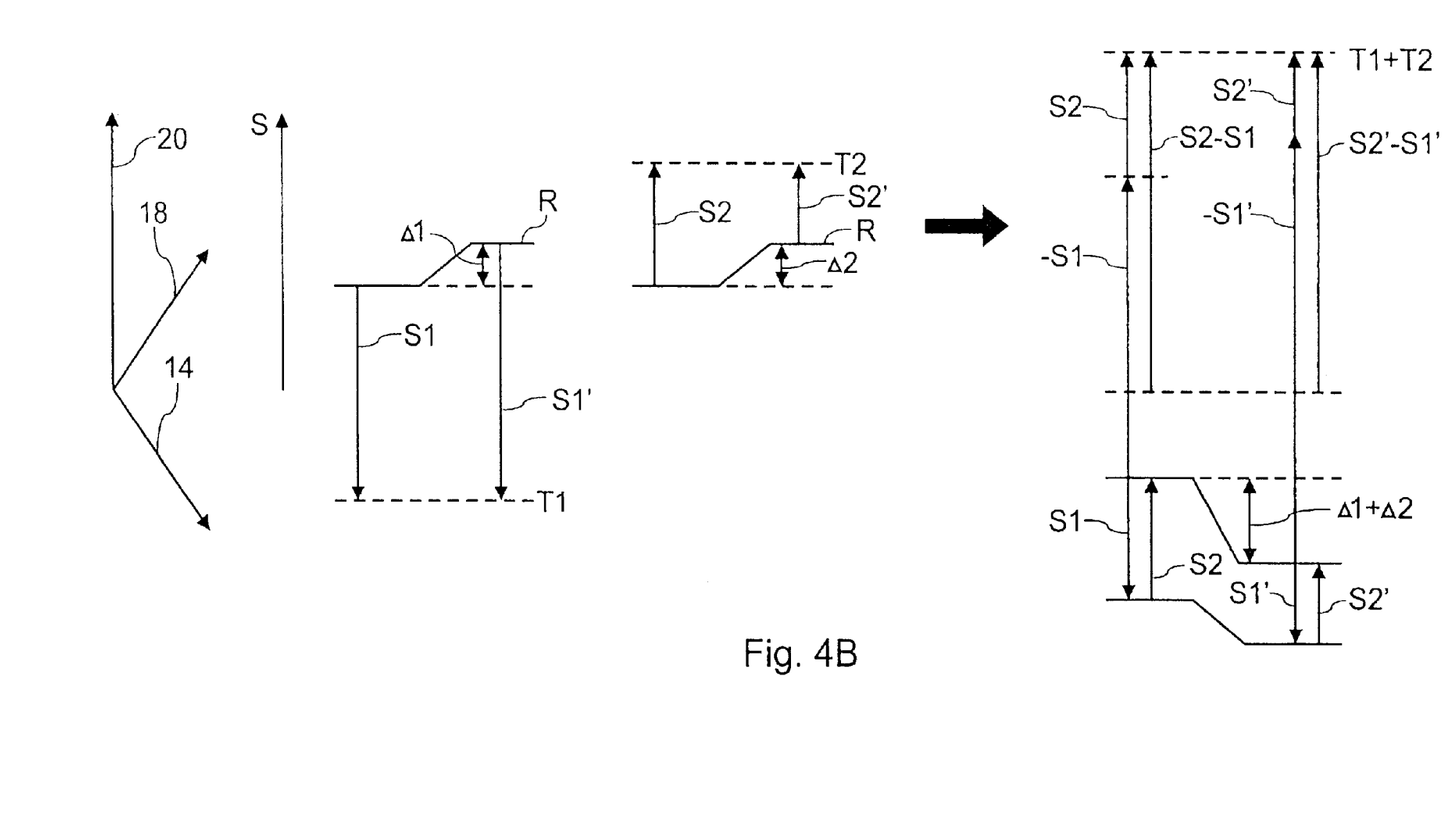
FIG. 4b shows a chart with diagrams which explain the development of the at least partial compensation for a measuring error when the reference signal is changed in a device with a sensor arrangement in accordance with the invention

If the first acceleration sensor 12 and the second acceleration sensor 14 are arranged as explained above with reference to FIG. 3, the effect is achieved that an assumed change Δ1 in the reference value R1 in the first evaluation channel has the opposite effect in relation to the initial threshold T1 of the first evaluation channel to the change Δ2 in the reference value in the second evaluation channel in relation to the initial threshold T2 of the second evaluation channel. This is shown in exemplary form in FIG. 4B. The left section of FIG. 4B shows the arrangement of the acceleration sensors similar to those shown in FIG. 2. Here, the first sensitivity direction 14 comprises a first main projection onto the main direction of measurement 20, which is aligned counter to the main direction of measurement 20, and the second sensitivity direction 18 of the second acceleration sensor comprises a second main projection, which is aligned parallel to the main direction of measurement 20.

As in the above explanations of FIG. 4A, in FIG. 4B, it is assumed that a frontal collision occurs. Since the first main projection is aligned counter to the main direction of measurement (and is counter to the projection shown in FIG. 4A), the first acceleration sensor generates a signal F1 (not shown) with an inverse preceding sign to that of the situation shown in FIG. 4A, which is therefore, in the case of 4B, negative. In contrast to this, the signal F2 produced by the second acceleration sensor 16 (not shown) is, in the example shown in FIG. 4B, positive. If the reference value in the first evaluation channel changes by a value of Δ1, and in the second evaluation channel, now changes in the same direction as shown in FIG. 4A by the same value Δ2, the trigger signal required in the first evaluation channel to reach the initial threshold T1 is increased from the value S1 to the value S1' and the trigger signal required in the second evaluation channel to reach the initial threshold T2 is decreased from the value S2 to the value S2'. The influence of the changes Δ1 and Δ2 in the reference value in relation to the initial thresholds T1 and T2 in the first and second evaluation channel is therefore opposite for the sensor arrangement according to the invention, in contrast to the situation shown in FIG. 4A.

In order to calculate the total acceleration component in the main direction of measurement 20 measured by the first and second acceleration sensor, the sign before the signal value in an evaluation channel must be inverted in relation to the signal value of the other evaluation channel. For example, the sign before the signal value F1 s inverted in the first evaluation channel, as shown in FIG. 4B. The resulting acceleration vector component in the main direction of measurement 20 is then calculated from the total (−F1)+F2, in other words, from the difference F2−F1, of the signal values F2 and F1 from the second and first acceleration sensor, 16 and 12. If the reference value now changes as in the example shown in FIG. 4B by the amount Δ1 in the opposite direction to the trigger signal S1 from the first evaluation channel, the trigger signal increases from the value S1 to the value S1'. In the second evaluation channel, the reference value changes by the amount Δ2 towards the initial threshold T2, so that the trigger signal of the second evaluation channel is reduced from the value S2 to the value S2'. The subtraction between the measuring signals F2 and F1 causes the influence of the change of the reference signal in the two evaluation channels to be compensated, at least partially. In special cases when the first main direction of measurement 14 is arranged at an angle of 135° and the second main direction of measurement 18 is arranged at an angle of 45° to the main direction of measurement 20, and that the acceleration runs essentially precisely along the main direction of measurement when a collision occurs, and that the changes Δ1 and Δ2 in the reference values in the first and second evaluation channel are essentially the same amount, the influences of the changes Δ1 and Δ2 to the reference values fully compensate each other in the two evaluation channels.

The at least partial error compensation is in principle shown in the right section figure in FIG. 4B. As can be seen, the changes to the distances to the initial threshold T1+T2 compensate each other in the combination of the first and second evaluation channel due to the formation of the difference in the measuring signals F2−F1 (not shown), and accordingly, the difference S2−S1 in the trigger signals. When the change Δ1 in the reference signal in the first evaluation channel is therefore counter to the change Δ2 in the reference signal in the second evaluation channel, the formation of the difference between the signals F2 and F1 in the first and second evaluation channel leads at least to a partial compensation of the changes Δ1 and Δ2 to the reference values in relation to the initial thresholds T1 and T2 in the first and second evaluation channel. As a result, the tripping behaviour changes less significantly than in the situation shown in FIG. 4A with the sensor arrangement according to the current art, and in the special case described above, the tripping behaviour does not change at all.

In order to attain at least the partial compensation of the influence of the change in reference values in the two evaluation channels, which is beneficial for the stability of the evaluation procedure, as an alternative to the subtraction between the signals F2 and F1 with a threshold value comparison with the total T2+T1 of the initial thresholds in the second and first evaluation channels, a summation of the signal values can be used simultaneously with the threshold value comparison with the difference T2−T1 between the initial thresholds during the evaluation procedure.

If the angular distance from the first sensitivity direction 14 to the transverse direction 30 of the main direction of measurement 20 is different in its amount to the angular distance from the second sensitivity direction 18 to the transverse direction to the main direction of measurement 20, a weighted subtraction or weighted summation of the measuring signals with a simultaneous threshold value comparison with a weighted total or weighted difference of the initial thresholds can be provided in the first and second evaluation channel, in order to improve the compensation of the influence of the change in the reference values of the signals, instead of the usual subtraction or summation of the measuring signals or initial thresholds described as an example above for clarification purposes.

The total or subtraction can be used directly on the measuring signals supplied by the first and second sensor. The total or subtraction can also be used on a potentially filtered measuring signal, such as an integrated measuring signal which has been equalised by a low-pass or by an integration switch, in general, therefore, on a processed signal F1 and F2 (not shown), in any event as log as the processing can be represented by a linear or at least monotone function.

A weighted subtraction or a weighted summation of the processed first signal F1 in the first measuring channel and the processed second signal F2 in the second measuring channel is here understood to be expressed by the formula:

$a1*F1-a2*F2$ or $a1*F1+a2*F2$ whereby a1 and a2 are scaling factors, which can lie between zero and 1 (i.e. 0<a1, a2<1). Accordingly, a weighted threshold summation function or threshold difference function in the first initial threshold T1 in the first evaluation channel and the second initial threshold T2 in the second evaluation channel is understood to be expressed by the formula:

$b1*T1+b2*T2$ or $b1*T1-b2*T2$ whereby b1 and b2 are scaling factors, which can lie between zero and 1 (i.e. 0<b1, b2<1).

A particularly complete compensation of the influence of the change in the reference value in the two evaluation channels results when the scaling factors a1 or a2, depending on the angles $\alpha1$ or $\alpha2$ of the first or second sensitivity direction 14 or 18 to the main direction of measurement 20, are selected as follows:

$a1 \approx \cos \alpha1$ and $a2 \approx \cos \alpha2.$

Figure 5:
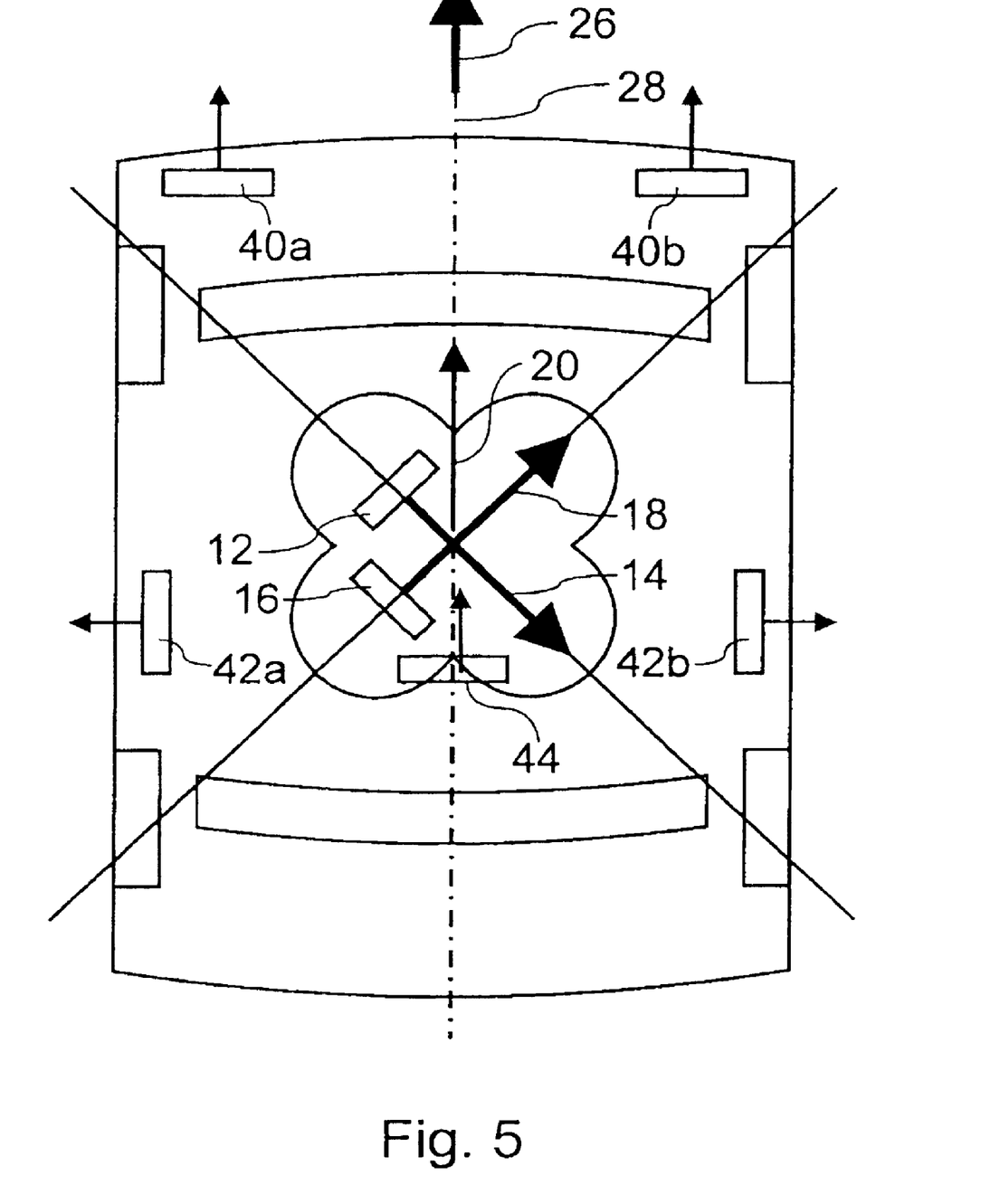
FIG. 5 shows a schematic view of a sensor arrangement according to the invention with additional satellite sensors in a vehicle in a top view.

In motor vehicles, it is particularly advantageous when the sensor arrangement according to the invention is installed together with devices for evaluating the sensor signals in a shared central control device. It is particularly advantageous when the control device is arranged at an essentially central position in the motor vehicle. However, in practise, in particular to fulfil the requirements for the middle to upper vehicle range, further satellite sensors are arranged in the vehicle, in order to be able to measure collision events with different directions of impact in a particularly sensitive or precise manner. An extended sensor arrangement is shown as an example in FIG. 5. The extended sensor arrangement comprises the centrally arranged first acceleration sensor 12 with the first sensitivity direction 14 and the second acceleration sensor 16 with the second sensitivity direction 18, additionally so-called "upfront" sensors 40 arranged on the front side of the vehicle with a sensitivity direction which is aligned in the forwards direction 26 of the vehicle (for example, a left upfront sensor 40a and a right upfront sensor 40b), side sensors 42 which are attached to the sides of the vehicle, with a sensitivity direction which is aligned transverse to the longitudinal vehicle axis (for example, a left side sensor 42a which is attached to the left side of the vehicle and which has a sensitivity direction which is aligned to the left, and a right side sensor 42b which is attached to the right side of the vehicle and which has a sensitivity direction which is aligned to the right), and finally, a sensor which is arranged in the central control device, for example (a so-called "safing" sensor 44).

In the medium and upper vehicle range, a trigger strategy of the subscriber is currently frequently used, in order to evaluate the signals from the first and second sensors arranged in the central control device, and to link them to the signals from the upfront, side or safing sensors in order to generate a trigger signal for corresponding passenger protection facilities. According to this evaluation strategy, different passenger protection facilities are triggered and if appropriate, triggered, depending on the direction of the collision event. Here, the signals of specific sensors which are particularly suitable for the collision direction in question are systematically assigned a dominant influence compared to the signals from the other sensors. For example, when frontal collision events occur, the signals from the upfront sensors 40 are assigned a more dominant influence when a trigger signal is generated for an airbag system located in front of a passenger as compared to the signals for the side sensors 42. Accordingly, the side airbag systems arranged to the side of the passengers in order to protect them during collision events with a direction of impact from the side are triggered by trigger signals during the generation of which the measuring signals form the side sensors 42 have a more dominant influence than the signals from the upfront sensors 40.

Figure 6A:
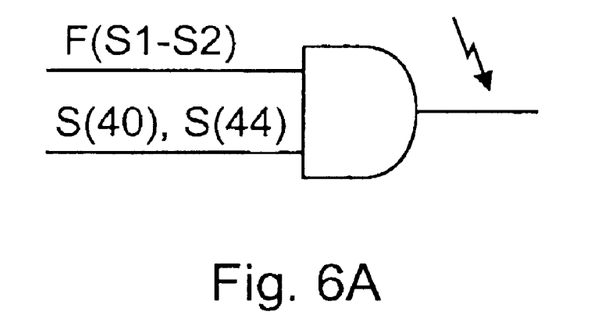
FIGS. 6A, 6B and 6C show schematic views of the stages of evaluation of processed measuring signals from the acceleration sensors which are arranged in accordance with the invention, together with processed signals from an additionally arranged upfront, safing or side sensor
Figure 6B:
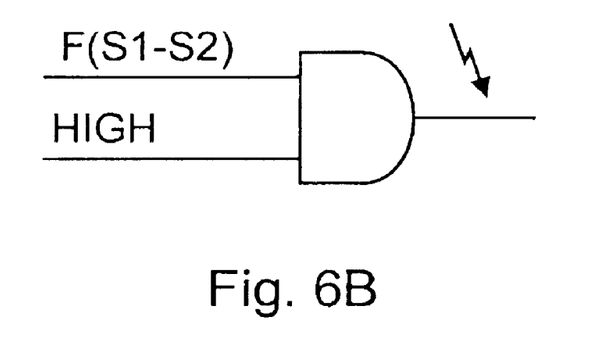
Figure 6C:
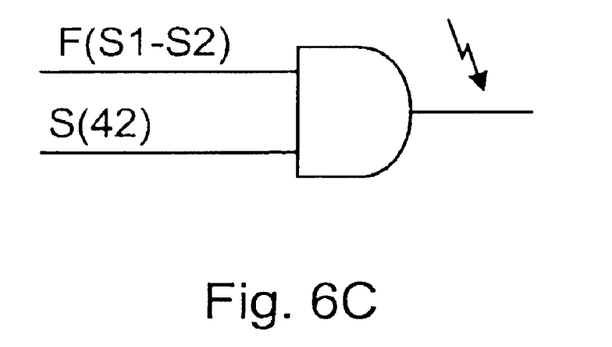

The device according to the invention with a first and second sensor is easy to integrate into the trigger strategy described above, and can be integrated particular advantage. Depending on the direction of impact of the collision event, in this trigger strategy, the trigger signals for cases when collision occurs from the front, from the side or from the rear, which are derived from the two sensors arranged according to the invention, are linked to the trigger signals which are derived from the other sensors shown in FIG. 5 in a different way in order to generate a verification check, as shown in FIGS. 6A, 6B and 6C.

When a frontal collision occurs, in order to generate an overall trigger signal, a trigger signal f (S1-S2) which is derived from one of the two sensors arranged according to the invention, and which has for example been generated by the subtraction of the processed signals from the first evaluation unit and the second evaluation unit, can be linked with the information from an upfront sensor 40 or a safing sensor 44 in such a manner that the upfront or safing sensors supply a verification of the trigger signals derived from the sensors arranged according to the invention. In particular, a logical AND link is provided in the trigger strategy described, in order to generate the verified overall trigger signal for the front airbag system, as shown in FIG. 6A.

When a rear collision occurs, no verification check is provided for the trigger signals derived from the two acceleration sensors arranged according to the invention with the trigger signals derived from the remaining sensors. In FIG. 6B, this is indicated by the fact that with the logical AND link, the verification signal is consistently set to a logical 'HIGH', so that the trigger signal f (S1-S2) which is derived from the two sensors arranged according to the invention also supplied the overall trigger signal for a protection facility which should appropriately be triggered should a rear collision occur.

Finally, if a side collision occurs, the trigger signal f (S1-S2) which is derived from the two acceleration sensors arranged according to the invention can be linked to tee information from the side sensors 42 in a verifying manner, in order to generate a trigger signal. In particular, a logical AND link for the trigger signal f (S1-S2) is provided with a trigger signal derived from one of the side sensors 42, as shown in FIG. 6C, in order to generate the verified overall trigger signal for a side airbag system.

For motor vehicles, the sensor arrangement according to the invention can be used to particular advantage with a corresponding evaluation of the processed signals which has been adapted according to the invention in cases when the main direction of measurement 20 lies in the longitudinal axis 28 of the vehicle. In terms of the evaluation of frontal collision events, any possible change to the reference values in the first and second evaluation channel, as explained above with reference to FIG. 4B, will have a particularly insignificant effect with a sensor arrangement according to the invention, as explained above with reference to FIG. 3. On the other hand, with the particularly advantageous sensor arrangement according to FIG. 2, the Susceptibility to interference increases when changes are made to the reference values when side collisions occur. This is due to the fact that for collision scenarios of this nature, the direction of impact of the collision lies in a similar position as shown in FIG. 1 in relation to the first and second sensor, and for the measuring signals, trigger signals and initial thresholds in the first and second evaluation channel, a situation has arisen which is similar to that shown in FIG. 4A. The change in the tripping behaviour of the safety facility which may result is reduced or avoided during a verification check of the trigger information derived from the two sensors arranged according to the invention with the trigger information derived from the other sensors, if the side sensors arranged in the side area have a more dominant influence during the generation of the overall trigger signal than the sensors which are arranged according to the invention.

If the two sensors which are arranged according to the invention are arranged in an essentially central position in the vehicle, for example in a centrally arranged control device, the result is a more dominant influence of the side sensors arranged in the side area when a side collision is detected as compared to the other sensors, due to the fact that the side sensors are closer to the point of collision when a side collision occurs, and that they detect the acceleration earlier and more directly than the centrally arranged first and second sensors which are positioned further away from the point of collision (together with the upfront and safing sensors which are provided in order to measure accelerations along the longitudinal vehicle axis). Due to the less advantageous signal transmission path, which results, among other things, from the "softer" crusher zone transverse to the longitudinal vehicle axis (as compared to the crusher zone along the longitudinal vehicle axis), the sensors which are provided in order to measure accelerations along the vehicle longitudinal axis therefore play a subordinate role as compared to the side sensors.

One advantage which is attained with the sensor arrangement and signal evaluation according to the invention is an increase in the stability of the evaluation algorithm, and thus, an increase in protection against common error. A further advantage is that in particular when linking or conducting a verification check with the other sensors according to the trigger strategy currently used and which described above, the safing sensor, which is used as a trigger switch, is no longer required when providing adequate system reliability with regard to tripping behaviour when a frontal or rear collision occurs.

LIST OF REFERENCE NUMERALS

10 Measuring device
12 First acceleration sensor
14 First sensitivity direction
16 Second acceleration sensor
18 Second sensitivity direction
20 Main direction of measurement
22 First main projection
24 Second main projection
26 Forwards direction of the vehicle
28 Longitudinal vehicle axis
30 Transverse direction
$\alpha 1$ Angle between the main direction of measurement and the first sensitivity direction
$\alpha 2$ Angle between the main direction of measurement and the second sensitivity direction
$\beta$ Angle between the first and second sensitivity direction $|\alpha 1 - \alpha 2|$
40, 40a, 40b Upfront sensor; left and right upfront sensor
42, 42a, 42b Side sensor; left and right side sensor
44 Safing sensor
F1 Processed signal from the first acceleration sensor
F2 Processed signal from the second acceleration sensor
T1 Initial threshold from the first evaluation channel
T2 Initial threshold from the second evaluation channel
S1 Trigger signal from the first evaluation channel
S2 Trigger signal from the second evaluation channel
R1 Reference signal from the first evaluation channel
R2 Reference signal from the second evaluation channel
$\Delta 1$ Change in the reference signal in the first evaluation channel
$\Delta 2$ Change in the reference signal in the second evaluation channel

The invention claimed is:

1. A device (10) for measuring accelerations for a vehicle passenger protection system, the device being adapted to a prespecified main direction of measurement (20) and comprising:
   at least one first acceleration sensor (12) with a first sensitivity direction (14), which forms a first main projection (22) onto the main direction of measurement (20), and a first transverse projection (32) onto a transverse direction (30) which is aligned vertically to the main direction of measurement (20), and a first evaluation channel for processing a first measuring signal from the first acceleration sensor in relation to a first reference value (R1);
   a second acceleration sensor (16) with a second sensitivity direction (16), which forms a second main projection (24) onto the main direction of measurement (20), and a second transverse projection (34) onto the transverse direction (30), and a second evaluation channel for processing a second measuring signal from the second acceleration sensor in relation to a second reference value (R2); and
   evaluation devices for evaluating at least the first processed measuring signal (F1) and the second processed measuring signal (F2), and, at least partially, a trigger signal for the passenger protection system, which is generated based on the first measuring signal and the second measuring signal; wherein the first and second transverse projections (32, 24) in the first and second sensitivity directions (14, 18) are aligned parallel to each other, and the first and second main projection (22, 24) in the first and second sensitivity directions (14, 18) are aligned antiparallel to each other; and the evaluation is conducted in such a manner that at least a partial error compensation results when the first or second reference value (R1 or R2) in the first or second evaluation channel changes, wherein the trigger signal is used to activate the passenger protection system when it is determined that the vehicle has been in a crash.

2. A device according to claim 1, wherein the evaluation is conducted in such a way dependent on the alignment of the first and second sensitivity direction to the main direction of measurement that the error compensation is at a maximum level when the first and second reference value (Δ1 and Δ2) is changed.

3. A device according to claim 1, wherein a first evaluation channel comprises a first initial threshold (T1) and the second evaluation channel comprises a second initial threshold (T2), and the evaluation comprising a comparison of a first evaluation function of the processed first measuring signal and the second processed measuring signal (F1) with a corresponding second evaluation function of the first initial threshold (T1) and the second initial threshold (T2).

4. A device according to claim 3, wherein the first evaluation function is a weighted difference or total of the processed first measuring signal F1) and the processed second measuring signal (F2), and the corresponding second evaluation function can be a weighted total or the difference between the first initial threshold (T1) and the second initial threshold (T2).

5. A device according to claim 1, wherein the first reference value (R1) and the second reference value (R2) are a reference value shared by the first and second evaluation channel.

6. A device according to claim 1, wherein an angular distance of the first sensitivity direction (14) and the angular distance of the second sensitivity direction (18) preferably does not equal 0° or 90°, both in the main direction of measurement (20) and in the transverse direction, and is in particular larger than or equal to 10°.

7. A device according to claim 1, wherein an angular distance between the first sensitivity direction (14) and the second sensitivity direction (18) is essentially 90°.

8. A device according to claim 1, wherein the angle of the first sensitivity direction (14) can be 45° or 135°, and the angle of the second sensitivity direction is essentially 45° and 135°, or −45° and −135°, or 225° and 315° to the main direction of measurement (20), and the angle of the second sensitivity direction (18) is essentially 135° and 45°, or −135° and −45°, or 315° or 225° to the main direction of measurement (20).

9. A device according to claim 1, wherein the main direction of measurement (20) is essentially the forwards direction (26) of the vehicle.

10. A device according to claim 1, wherein the main direction of measurement (20) is essentially vertical to the forwards direction (28) of the vehicle.

11. A device according to claim 1, wherein the first and second acceleration sensor (12, 16) and the evaluation devices are arranged in one central unit.

12. A device according to claim 1 further comprising:
   at least one upfront sensor (40) or at least one side sensor (42) or a safing sensor (44).

13. A procedure for measuring accelerations for a vehicle passenger protection system comprising:
   i) determining a main direction of measurement (20) in relation to a forwards direction (26) of a vehicle;
   ii) providing a first acceleration sensor (12) with a first sensitivity direction (14), which forms a first main projection (22) onto the main direction of measurement (20), and a first transverse projection (32) onto a transverse direction (30) which is aligned vertically to the main direction of measurement (20);
   iii) providing a second acceleration sensor (26) with a second sensitivity direction (18), which forms a second main projection (24) onto the main direction of measurement (20), and a second transverse projection (24) onto a transverse direction (30), wherein the first and second transverse projection (32, 24) of the first and second sensitivity direction (14, 18) are parallel to each other, and the first and second main projection (22, 24) of the first and second sensitivity direction (14, 18) are antiparallel to each other;
   iv) processing a first measuring signal from the first acceleration sensor (12) to form a first processed signal (F1) in relation to a first reference value (R1) in a first evaluation channel for processing the first signal from the first acceleration sensor (12);
   v) processing a second measuring signal from the second acceleration sensor (16) to form a second processed signal (F2) in relation to a second reference value (R2) in a second evaluation channel for processing a second signal from the second acceleration sensor (16); and
   vi) evaluating the first and second processed signal (F1 and F2) in relation to a corresponding first and second initial threshold (T1 and T2), so that at least a partial error compensation results when the first and second reference values (R1 and R2) in the first and second evaluation channel change, wherein the passenger protection system is activated when it is determined that the vehicle has been in a crash crash.

14. A procedure according to claim 13, wherein the evaluation dependant on the alignment of the first and second sensitivity direction to the main direction of measurement is conducted in such a manner that the error compensation when the first and second reference value is changed is at the maximum level.

15. A procedure according to claim 13, wherein the evaluation in stage vi) further comprises:
   a) forming a weighted threshold summation function or threshold subtraction function for the first initial threshold (T1) and the second initial threshold (T2);
   b) forming a weighted subtraction function or summation function of the processed first measuring signal (F1) and the processed second measuring signal (F2);
   c) comparing the weighted subtraction function or summation function from stage b) with the weighted threshold summation function or threshold subtraction function from stage a); and whereby the trigger signal is furthermore set into the trigger-ready state when the weighted subtraction function or summation function from stage b) exceeds the weighted threshold summation function or threshold subtraction function from stage a).

16. A procedure according to claim 15, wherein in stage b), the weighted subtraction function or summation function of the processed first measuring signal (F1) and the processed second measuring signal (F2) comprises the formula $$a1*F1-a2*F2$$

or $$a1*F1+a2*F2$$

and a1 an a2 are scaling factors with 0 <b1, b2<1, and in stage a), the weighted threshold summation function or threshold subtraction function of the first initial value (T1) and the second initial value (T2) comprise the formula $$b1*T1-b2*T2$$

or $$b1\ T1+b2T2$$

wherein b1 and b2 are scaling factors with 0<b1, b2<1.

17. A procedure according to claim 16, wherein $a1 \approx \cos \alpha1$ and $a2 \approx \cos \alpha2$,
   wherein $\alpha1$ is the angle between the main direction of measurement (20) and the first sensitivity direction (14), and $\alpha2$ is the angle between the main direction of measurement (20) and the second sensitivity direction (18).

18. A procedure according to claim 13, wherein the first reference value (R1) and the second reference value (R2) are a reference value shared by the first and second evaluation channel.

19. A procedure according to claim 13, wherein in stages iv) and v) the processing of the first, or measuring, signal of the first, or acceleration, sensor (12 and 16) during the procedure comprises at least one integration of the measuring signal.

* * * * *